US012588784B2

(12) United States Patent
Kowach

(10) Patent No.: US 12,588,784 B2
(45) Date of Patent: Mar. 31, 2026

(54) MIXING UTENSIL

(71) Applicant: Thomas J. Kowach, Torrance, CA (US)

(72) Inventor: Thomas J. Kowach, Torrance, CA (US)

( * ) Notice: Subject to any disclaimer, the term of this patent is extended or adjusted under 35 U.S.C. 154(b) by 0 days.

(21) Appl. No.: 19/215,171

(22) Filed: May 21, 2025

(65) Prior Publication Data

US 2025/0359706 A1 Nov. 27, 2025

Related U.S. Application Data

(60) Provisional application No. 63/651,238, filed on May 23, 2024.

(51) Int. Cl.
*A47J 43/10* (2006.01)

(52) U.S. Cl.
CPC ...................................... *A47J 43/10* (2013.01)

(58) Field of Classification Search
CPC .... A47J 43/1093; A47J 43/0711; A47J 19/04;
A47J 43/1068; A47J 2043/04454; A47J
31/4403; A47J 36/165; A47J 43/044;
A47J 43/10; A47J 43/1075; A47J
43/1087; A47J 43/126; A47J 43/27; A47J
43/28; A47J 43/288; B01F 33/5011; B01F
2101/08; B01F 27/13; B01F 27/1125;
B01F 27/96; B01F 35/32021; B01F
27/95; B01F 2101/1805; B01F 23/50;
B01F 25/45; B01F 27/052; B01F
35/3202; B01F 2101/06; B01F 2101/14;
B01F 2101/30; B01F 27/00; B01F 27/82;
B01F 27/113; B01F 33/25; B01F 33/50;
B01F 33/50115; A21C 1/141; A21C 1/02;
B65D 23/04; H05B 6/745; Y10S 215/08;
A01B 1/22
See application file for complete search history.

(56) References Cited

U.S. PATENT DOCUMENTS

| | | | | |
|---|---|---|---|---|
| 581,493 | A | * | 4/1897 | Saltsman ................ A47J 19/04 |
| | | | | 366/129 |
| 2,269,301 | A | | 1/1942 | Anstice |
| 7,923,048 | B2 | | 4/2011 | Graham et al. |
| D702,513 | S | * | 4/2014 | Harris ............................ D7/682 |
| 2009/0059715 | A1 | | 3/2009 | Vendl et al. |
| 2013/0044560 | A1 | | 2/2013 | Ho et al. |
| 2022/0133092 | A1 | * | 5/2022 | Jayabalan ............. A47J 43/044 |
| | | | | 366/343 |
| 2022/0168698 | A1 | | 6/2022 | Walters |

FOREIGN PATENT DOCUMENTS

| | | |
|---|---|---|
| CA | 2792833 A1 | 9/2010 |
| CN | 204192426 U | 3/2015 |

* cited by examiner

*Primary Examiner* — Eric J Zamora Alvarez

(74) *Attorney, Agent, or Firm* — Inskeep IP Group, Inc.

(57) ABSTRACT

A mixing tool is disclosed, comprising a handle portion with an elongated shape and a tool portion connected to one end of the handle. The tool portion features an outer frame with a loop shape and multiple elongated fins, each attached to the outer frame. These elongated fins have a first edge that extends along the length of a first side of each fin. The sides of the fin may be configured at an angle greater than 5° and less than 90° to the center plane. The design facilitates efficient mixing by enhancing the tool's ability to agitate and combine materials effectively.

20 Claims, 14 Drawing Sheets

MIXING UTENSIL

RELATED APPLICATIONS

This application claims benefit of and priority to U.S. Provisional Application Ser. No. 63/651,238 filed May 23, 2024 entitled Mixing Utensil, which is hereby incorporated in its entirety.

BACKGROUND

Efficient mixing is a fundamental requirement across various industries, including food preparation, chemical processing, pharmaceutical formulation, and material synthesis. Whether blending ingredients for culinary applications, homogenizing compounds for pharmaceutical production, or integrating reactive agents in chemical processes, the effectiveness of a mixing utensil directly impacts the consistency and quality of the final product.

Conventional mixing tools, such as stirring rods, whisks, and paddles, often rely on manual agitation to achieve uniform distribution. However, these designs may not optimize fluid dynamics, requiring extensive effort and time to achieve thorough mixing, particularly in high-viscosity or heterogeneous compositions. Existing solutions frequently lack the capability to enhance aeration, dispersion, or integration across a broad range of materials.

SUMMARY

In some aspects, the techniques described herein relate to a mixing tool, including a handle portion having an elongated shape; and, a tool portion connected at an end of the handle portion; the tool portion including an outer frame having a loop shape and a plurality of elongated fins that are each connected at to the outer frame; wherein each of the plurality of elongated fins include a first edge extending along a length of a first side of each of the elongated fins.

In some aspects, the techniques described herein relate to a mixing tool, wherein at least some of the plurality of elongated fins are each connected at a proximal area and at a distal area of the outer frame in a generally longitudinal orientation.

In some aspects, the techniques described herein relate to a mixing tool, wherein the plurality of elongated fins are curved towards one of lateral sides of the outer frame.

In some aspects, the techniques described herein relate to a mixing tool, wherein the plurality of elongated fins include a second edge extending along a length of a second side of each of the elongated fins, wherein the second side is opposite the first side.

In some aspects, the techniques described herein relate to a mixing tool, wherein the outer frame includes a second edge positioned around a portion of the loop shape.

In some aspects, the techniques described herein relate to a mixing tool, wherein the outer frame and the plurality of elongated fins form a concave shape.

In some aspects, the techniques described herein relate to a mixing tool, wherein at least some of the plurality of elongated fins are each connected to the outer frame in a generally lateral orientation.

In some aspects, the techniques described herein relate to a mixing tool, wherein at least some of the plurality of elongated fins are each connected to the outer frame in a generally lateral orientation and intersect with some of the plurality of elongated fins with a longitudinal orientation.

In some aspects, the techniques described herein relate to a mixing tool, wherein at least some of the plurality of elongated fins are each connected to the outer frame and orientate at an angle within an inclusive range of about 10 degrees and 80 degrees relative to a longitudinal axis of the mixing tool.

In some aspects, the techniques described herein relate to a mixing tool, wherein each of the plurality of elongated fins include a diamond, rhombus, triangular, or teardrop cross sectional shape.

In some aspects, the techniques described herein relate to a mixing tool, wherein the first edge of at least some of the plurality of elongated fins forms a cross-sectional shape having an angle within an inclusive range of about 20 degrees to about 160 degrees.

In some aspects, the techniques described herein relate to a mixing tool, wherein the angle of the cross-sectional shape is about 45 degrees.

BRIEF DESCRIPTION OF THE DRAWINGS

The following figures are included to illustrate certain example aspects of the present disclosure and should not be viewed as exclusive or limiting. The subject matter disclosed is capable of considerable modifications, alterations, combinations, and equivalents in form and function, as will occur to one having ordinary skill in the art and having the benefit of this disclosure. The present disclosure references the drawings as follows.

DETAILED DESCRIPTION

Figure 1:
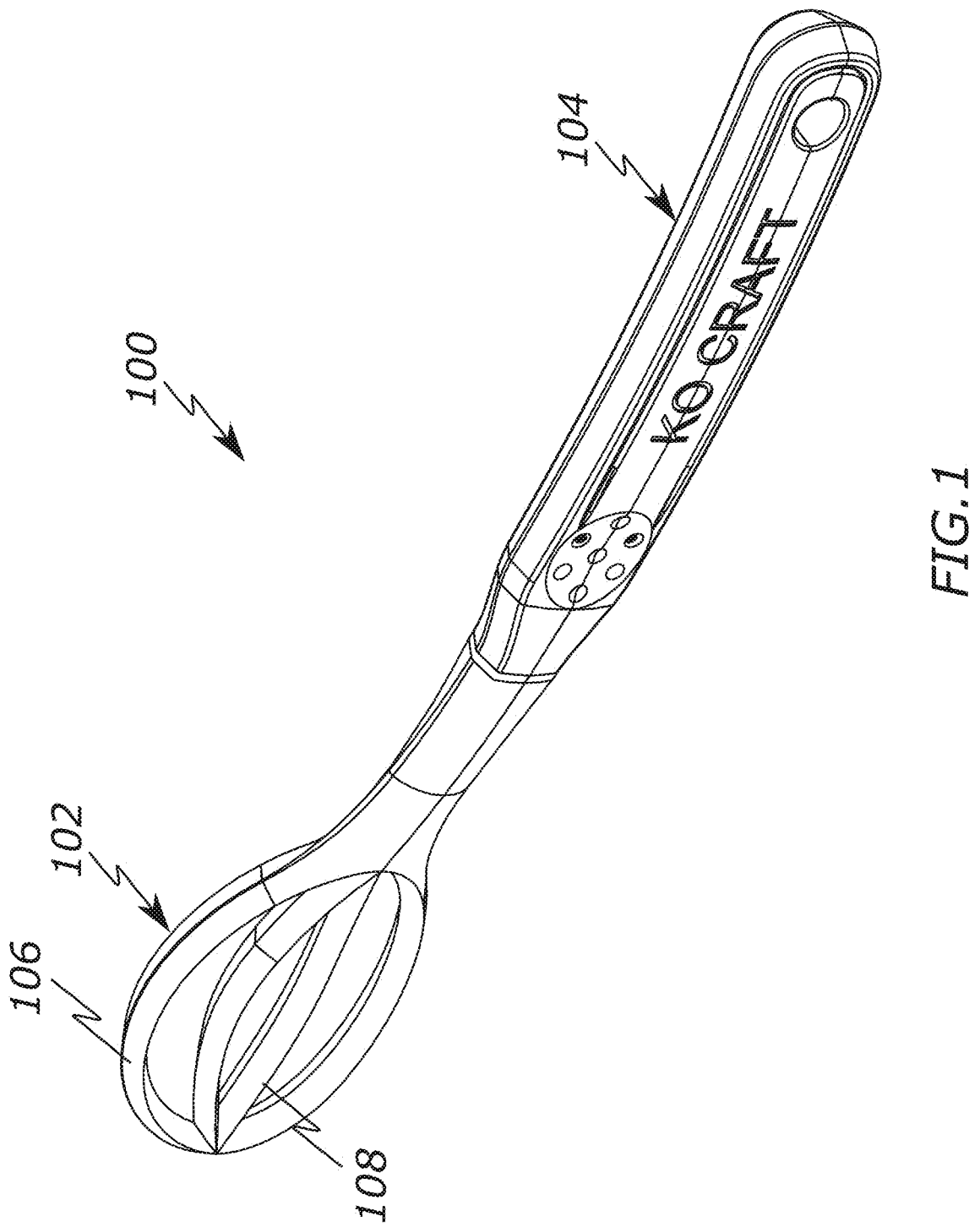
FIG. 1 illustrates a perspective view of one example of a mixing tool.

It will be appreciated by persons skilled in the art that the present disclosure is not limited to what has been particularly shown and described herein. A variety of modifications and variations are possible in view of the teachings herein without departing their scope, spirit, or intent.

While different examples may be described in this specification, it is specifically contemplated that any of the features from the different examples can be used and brought together in any combination. In other words, the features of different examples can be mixed and matched with each other. Hence, while every permutation of features from different examples may not be explicitly shown or described, it is the intention of this disclosure to cover any such combinations, especially as may be appreciated by one of skill in the art.

The terminology used in this disclosure should be interpreted in a permissive manner and is not intended to be limiting. In the drawings, like numbers refer to like elements. Unless otherwise noted, all of the accompanying drawings are not to scale. Unless otherwise noted, the term "about" is defined to mean plus-or-minus 5% of a stated value.

Numerical ranges discussed in this specification should be interpreted as both inclusive numerical ranges and as covering/disclosing a plurality of numbers within the ranges. Specifically, a range should be considered to recite numbers that increment by two decimal places (hundredths) for the purposes of support in the claims (e.g., 0.01, 0.02, 0.03, etc.). Any of these incremented numbers from a range should be understood to have significance and importance in the context of the present specification.

The present specification is generally directed to a mixing utensil (also referred to as a mixing tool) having a tool portion that is connected to a handle portion. The tool portion may include one or a plurality of elongated fins located to and located within an outer frame, forming gaps therebetween. At least one side of each of the elongated fins, the outer frame, or both the elongated fins and the outer frame, may have an edge that helps move or cut into a material to be mixed. The cross-sectional shape of the edge's body may increase in size and angle to help deflect and direct the material into itself or into the container in which the mixing is performed. This dynamic may help move the tool portion of the mixing utensil through the material with greater ease, increase the blending action through increased material movement, while reducing the time needed to achieve a desired mixing result of the material.

In some examples, the elongated fins may be generally orientated longitudinally or between proximal and distal locations, where the handle portion is located proximally and the tool portion is located distally. In some examples, the elongated fins may be generally oriented laterally or generally perpendicular relative to proximal and distal locations. In some examples, the elongated fins may be generally oriented at an angle between 0 and 90 degrees relative to a longitudinal axis of the mixing utensil (e.g., about 45 degrees), referred to here as being intermediately oriented. In some examples, any combination of longitudinally, laterally, and intermediately oriented elongated fins may be part of the tool portion.

In some examples, the elongated fins may be straight or generally straight along its longitudinal axis. In other examples, the elongated fins may be curved in one or more directions, such as curving towards/away from the outer frame (i.e., side-to-side relative to the "face" of the tool portion) and/or a direction generally parallel to the outer frame (i.e., outward or backward relative to the "face" of the tool portion). Put another way, the tool portion may have an overall flat shape that generally all aligns within a plane or the tool portion may form a concave shape similar to the working end of a spoon.

In some examples, the outer frame is in the form of a loop which has a circular, oval, or rectangular shape that may help when scraping material in a bowl, a can, or similar container. The outer frame may form a complete, unbroken loop/circle/oval shape or may form a partial, broken circular/oval shape. In other examples, the outer frame may have a square, rectangular, or other polygon shape (e.g., pentagon, hexagon, etc.).

The elongated fins and optionally the outer frame may include at least one edge along most of or all of each of their lengths. In some examples, the edge may be oriented or exposed on a front side of the tool portion, on a rear side of the tool portion, or on both a front and back side of the tool portion.

The elongated fins and optionally the outer frame may have a cross-sectional shape in the form of a polygon (e.g., quadrilateral, rhombus, diamond, square, rectangular, triangular) teardrop (e.g., a rounded portion with a peak), or other combinations of planes and rounded portions.

The mixing utensils of this specification may be particularly helpful for mixing dry powered materials together, liquid materials together, or dry powered and liquid materials together. These materials may be those used in food preparation (e.g., eggs, pancake mix, dough, cake mix), chemical/drug preparation, construction material preparation (paints, adhesives, epoxies, etc.) or similar materials.

In some examples, the example mixing tools of this specification provide a flat slanted defection area combined with slots and a cutting edge. While whisk utensils are generally known, they are typically constructed as an arrangement of wires. The whisk wires have a cross section of circle, and do not come to a point to form a cutting edge. Moreover, the round whisk wires are typically used to add air into a liquid material that has a low viscosity, like whipping cream, and are often not effective for mixing of high viscosity liquid materials, like cake batter, because they get clogged up.

While slotted spoons are generally known, they are designed to pick up solid food and drain away or leave behind liquid that is present. Although a slotted spoon can be used for mixing, a slotted spoon does not have angled deflection edges designed to disrupt and blend material. Additionally, a slotted spoon does not have any cutting edges to assist in breaking up material for mixing.

While forks are generally known, they are designed to pick up food off a plate instead of using one's fingers. However, they may be sometimes used to mix items of low quantity and viscosity, but with very limited effectiveness. The fork prongs typically have a cross section of a square or rectangle. A fork does not have angles for deflection or edges that come to a point for cutting.

Several specific examples are discussed further below. However, these examples may be modified in with any of the features discussed elsewhere in this specification.

Figures 2, 3:
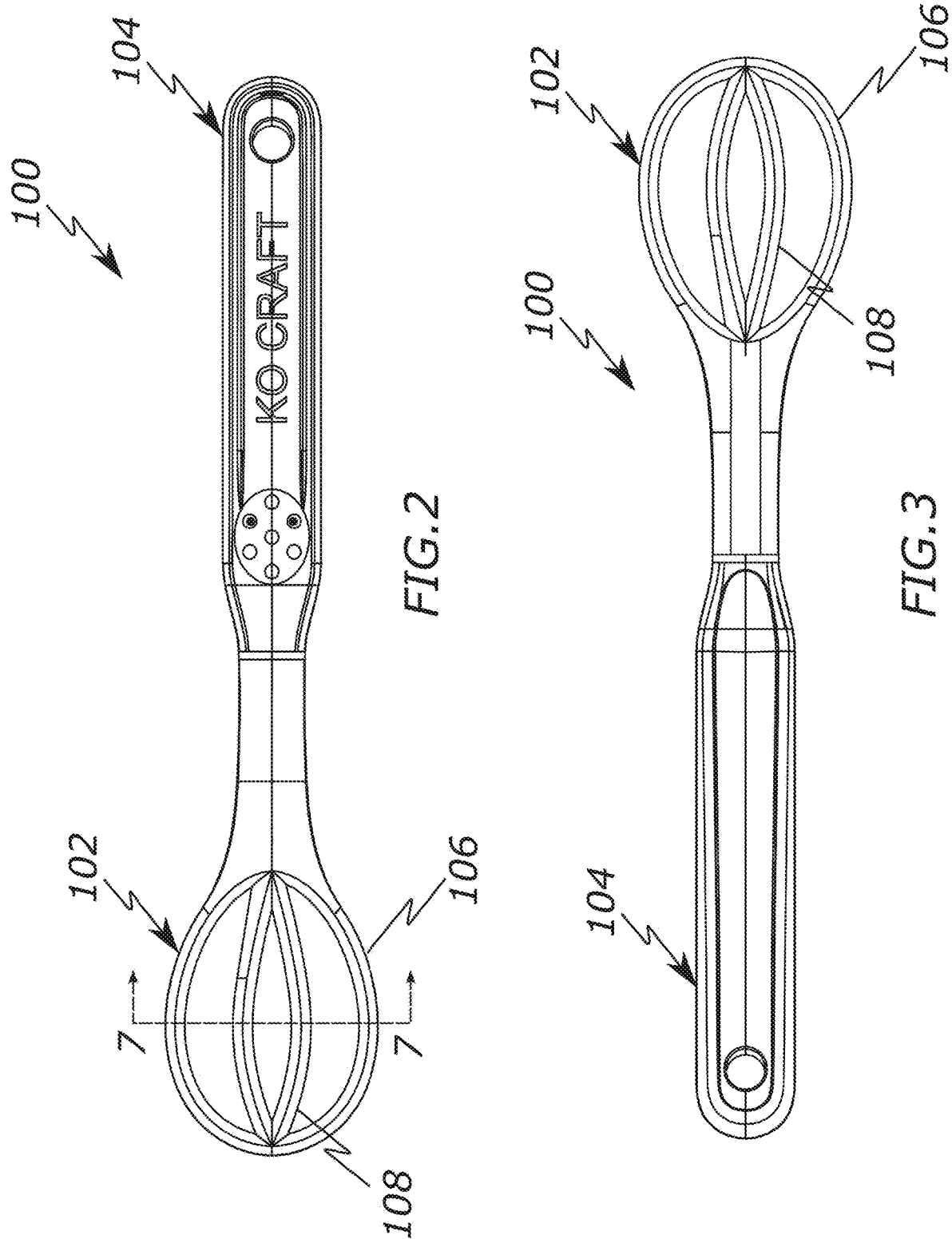
FIG. 2 illustrates a front side of the mixing tool of FIG. 1.
FIG. 3 illustrates a back side of the mixing tool of FIG. 1.
Figures 4, 5, 6:
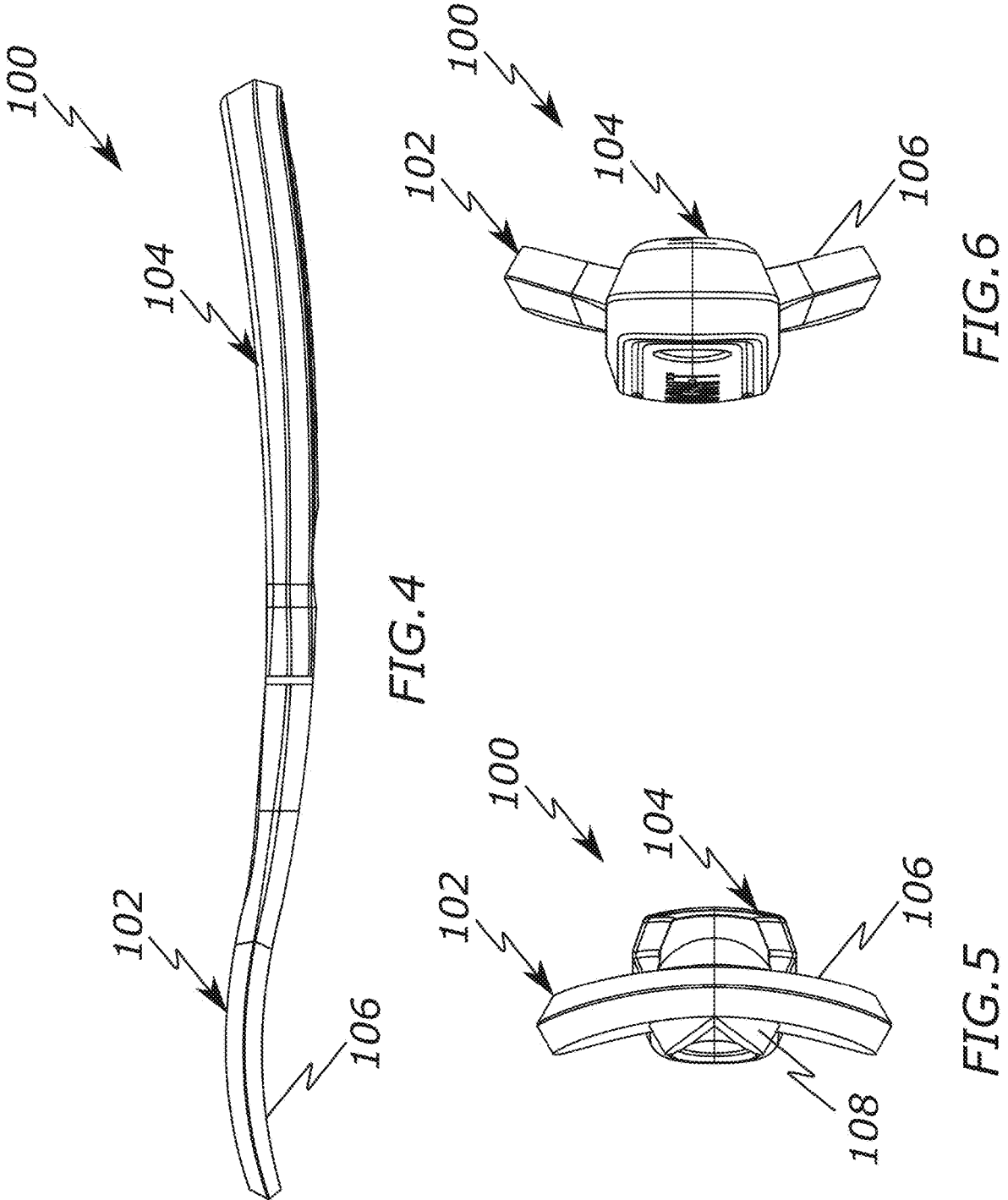
FIG. 4 illustrates a lateral side of the mixing tool of FIG. 1.
FIG. 5 illustrates a distal end view of the mixing tool of FIG. 1.
FIG. 6 illustrates a proximal end view of the mixing tool of FIG. 1.
Figure 7B:
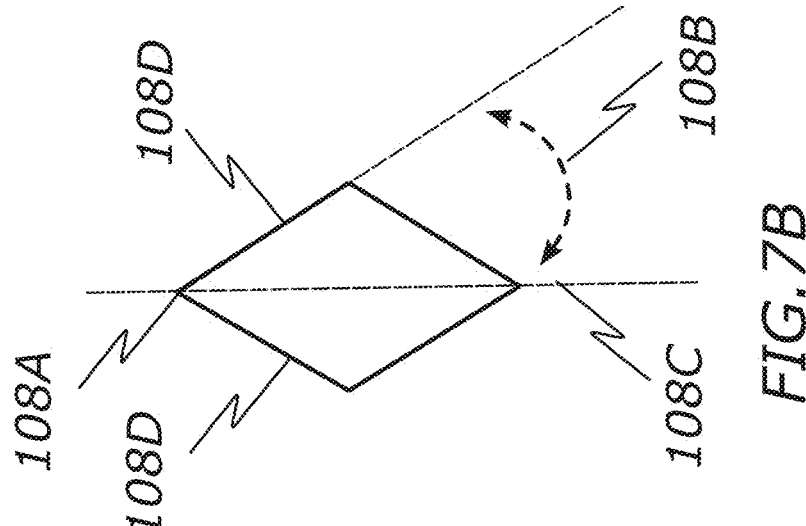
FIG. 7B illustrates a magnified view of one of the cross-sections of FIG. 7A.

FIGS. 1-7B illustrates a first example of a mixing tool 100. FIG. 1 illustrates a perspective view of the mixing tool 100, FIG. 2 illustrates a front side of the mixing tool 100, FIG. 3 illustrates a back side of the mixing tool 100, FIG. 4 illustrates a lateral side of the mixing tool 100, FIG. 5 illustrates a distal end view of the mixing tool 100, FIG. 6 illustrates a proximal end view of the mixing tool 100, FIG. 7A illustrates a cross-sectional view taken along lines 7-7 in FIG. 2, and FIG. 7B illustrates a magnified view of one of the cross-sections. These figures will be discussed concurrently below. In the present example, and any other example of this specification, the terms front side and back sides generally refer to sides in which a tool portion is at its widest, such as in FIGS. 2 and 3. In some examples, the front side and back side will be mirror images of each other and in other examples the front side and back side may have some differences (e.g., concave/convex portions, edges/rounded, etc.).

The mixing tool 100 may include a tool portion 102 with a plurality of elongated fins 108. The tool portion 102 may be connected to a distal end of a handle portion 104, either as a single unitary structure or as two separate structures that are physically joined/connected.

In the present example, the tool portion 102 has a generally oval shape formed in part by an outer frame 106 that connects to the handle portion 104. However, a variety of other shapes are possible, as discussed earlier.

In the present example, the tool portion 102 includes two elongated fins 108 that are each connected at distal and proximal areas of the outer frame 106, extending in a generally longitudinal orientation. As seen best, the plurality of elongated fins 108 may have a curvature towards the lateral sides of the tool portion 102 and away from each other. However, each of these plurality of elongated fins 108 may curve in other directions or may alternatively be generally straight.

In the present example, the tool portion 102 may form a generally concave "spoon" shape that curves in multiple dimensions. This may be seen in the lateral side view of FIG. 4 and the end views of FIGS. 5 and 6. Alternatively, the tool portion 102 may substantially align with a plane to have a generally flat shape overall.

Figure 7A:
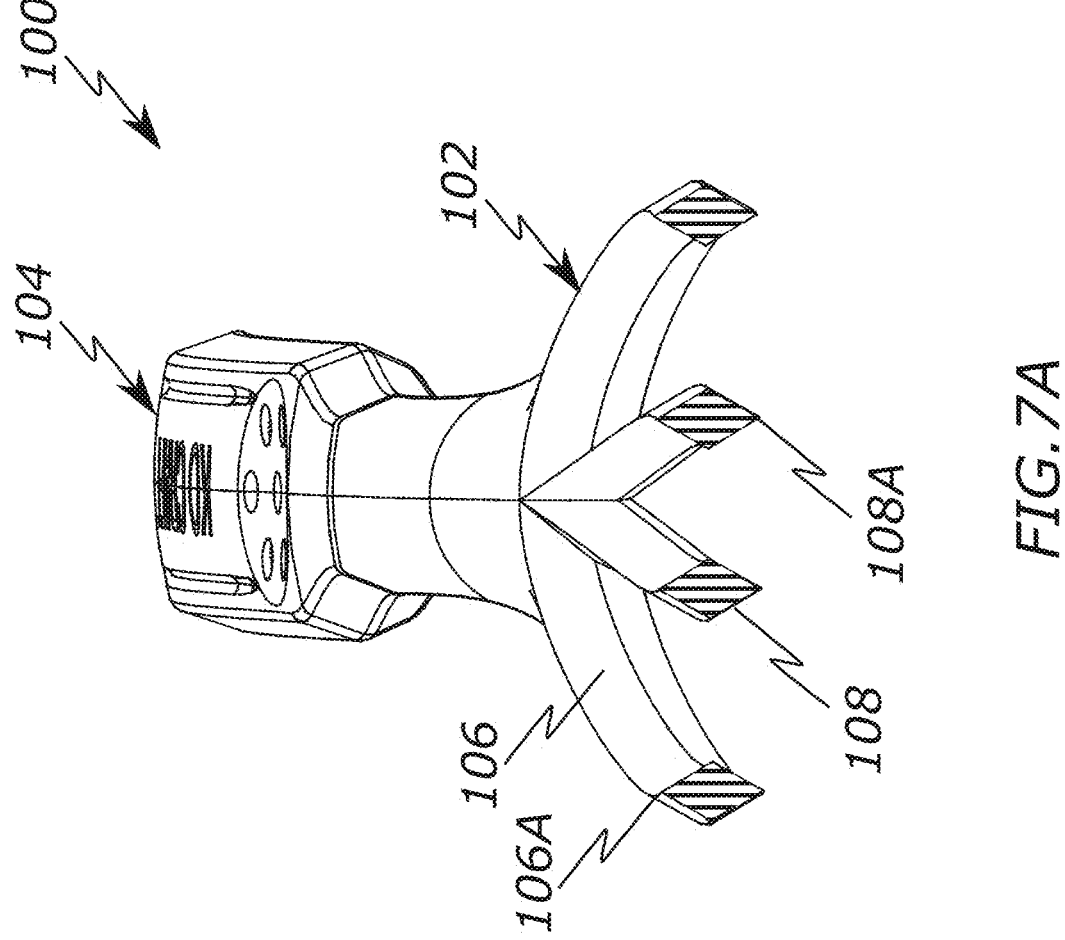
FIG. 7A illustrates a cross-sectional view taken along lines 7-7 in FIG. 2.

As best seen in the cross-sectional view of FIG. 7A, the plurality of elongated fins 108 and the outer frame 106 include an edge 108A and edge 106A, respectively. In the present example, an edge 108A and 106A may be oriented away from the front side and another pointed edge 108A may be oriented away from the backside of the tool portion 102. However, only a front or back edge 108A, 106A may be needed. Additionally, inclusion of an edge 108A, 106A on one or both lateral sides, as seen in FIG. 7A is also possible.

In the present example, the outer frame 106 and the plurality of elongated fins 108 have a rhombus, square, or diamond shape, however, other shapes are possible as discussed elsewhere in this specification. In reference to the cross section of the plurality of elongated fins 108 and the outer frame 106, it may be helpful for the surfaces on each side of the edge 108A, 106A to form an angle within the cross section that is not unduly wide or narrow (e.g., angle 108B and deflecting sides 108D in FIG. 7B). In other words, if the edge 108A, 106A is too flat it may simply push material around similar to a typical spatula and if the edge 108A, 106A narrow/thin, it will only slice through the material without causing much of any mixing. An intermediate angular range may both slice into certain materials and cause those materials to be pushed to the side. In some examples, the angle 108B may be formed between a side surface 108D of the cross section and a plane 108C or line bisecting the cross section and aligning with the edge 108A. In such examples, the angle 108B may be within an inclusive range of about 5 degrees to about 85 degrees in reference to the center plane 108C. In one specific example, the angle is about 22.5 degrees from the center plane 108C or 45 degrees overall between both sides of the cross section. These example angles may be applicable for edges of any of the examples/embodiments in this specification, including any elongated fins and portions of the outer frame.

The handle portion 104 may be a rigid structural member with an elongated shape that may be sized in length and diameter for user to grasp. For example, the handle portion 104 may have a length within an inclusive range of about 3 inches to about 8 inches. In some examples, the handle portion 104 may have a generally rectangular shape, a generally cylindrical shape, or combinations of both.

As seen in FIG. 4, the lateral side profile of the mixing tool 100 may have a gentle bow or curve that helps provide a more ergonomic angle to the handle portion 104 while also angling the tool portion 102 to help mixing. Alternatively, the lateral side profile may be straight.

Figure 8:
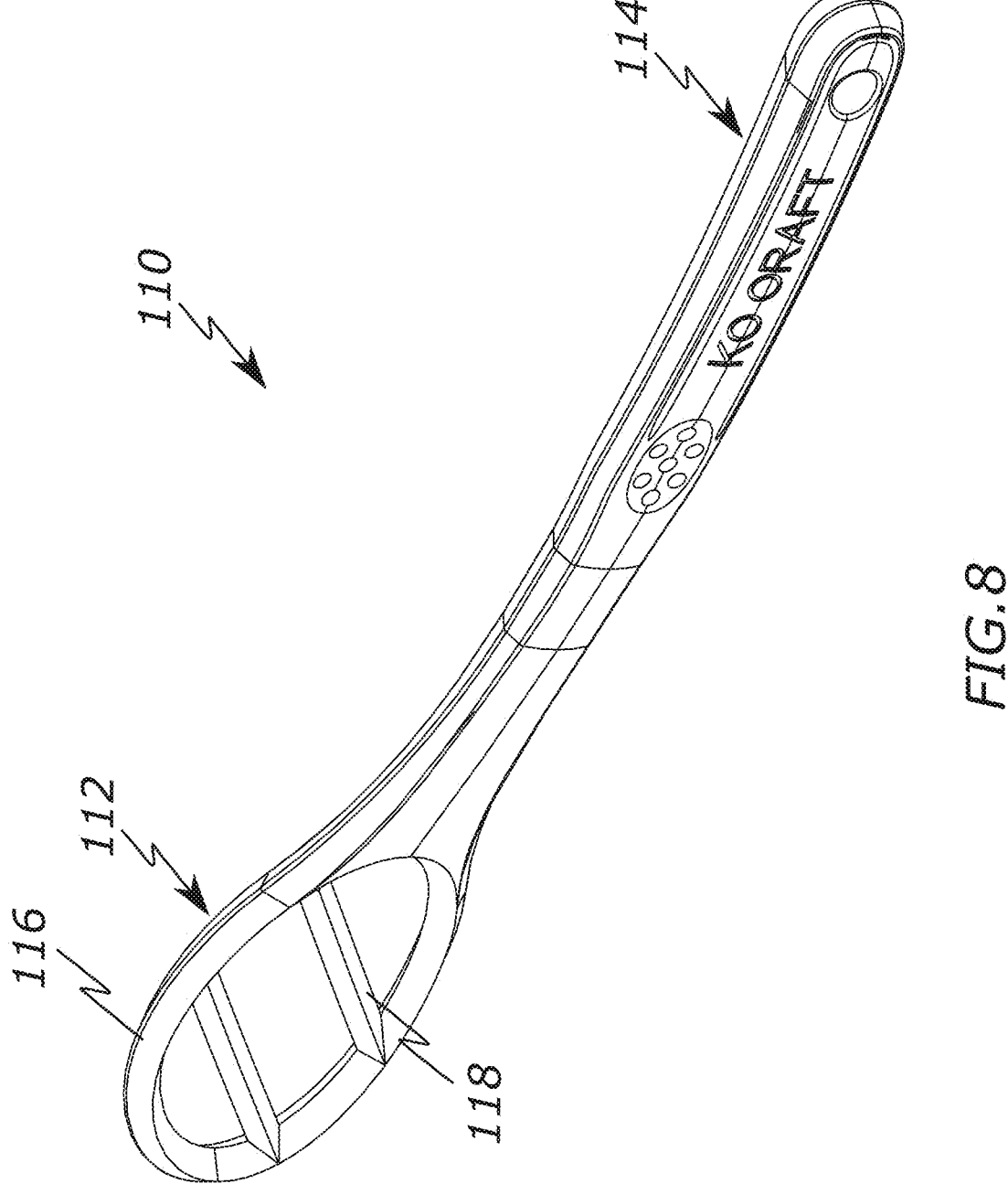
FIG. 8 illustrates a perspective view of an example mixing tool 110.
Figures 9, 10:
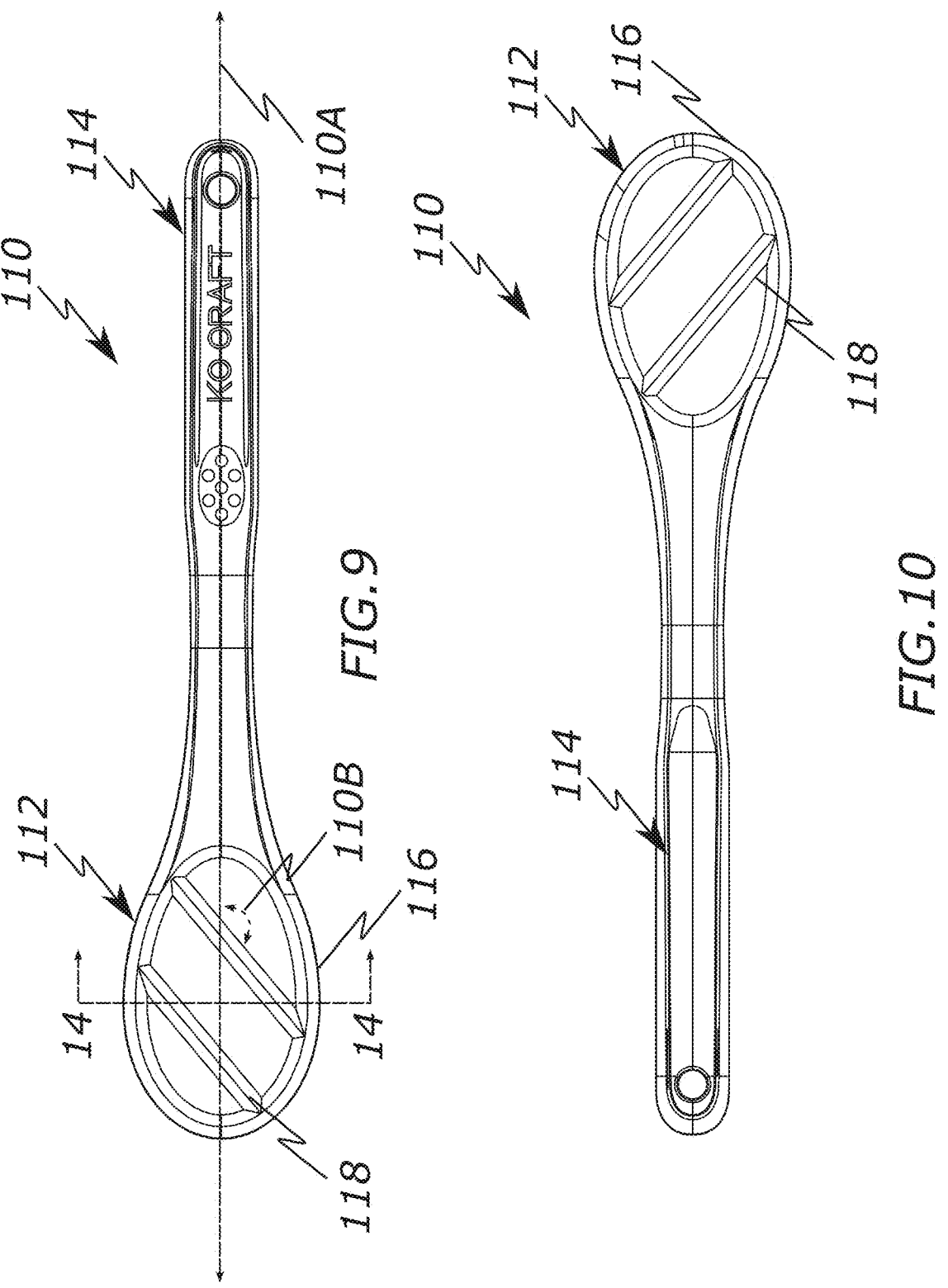
FIG. 9 illustrates a front side of the mixing tool 110.
FIG. 10 illustrates a back side of the mixing tool 110 of FIG. 9.
Figures 11, 12, 13:
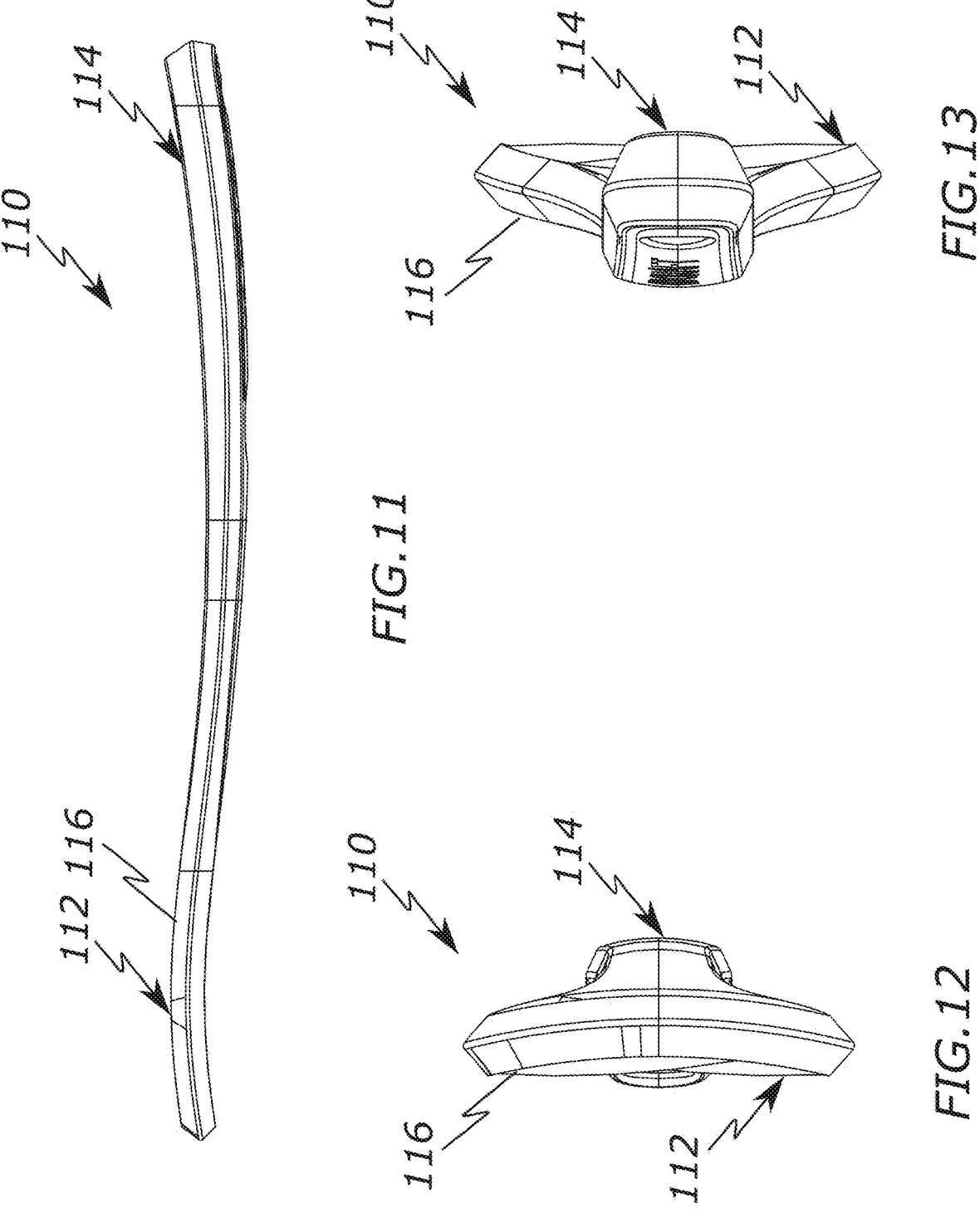
FIG. 11 illustrates a lateral side of the mixing tool 110 of FIG. 9.
FIG. 12 illustrates a distal end view of the mixing tool 110 of FIG. 9.
FIG. 13 illustrates a proximal end view of the mixing tool 110 of FIG. 9.
Figure 14:
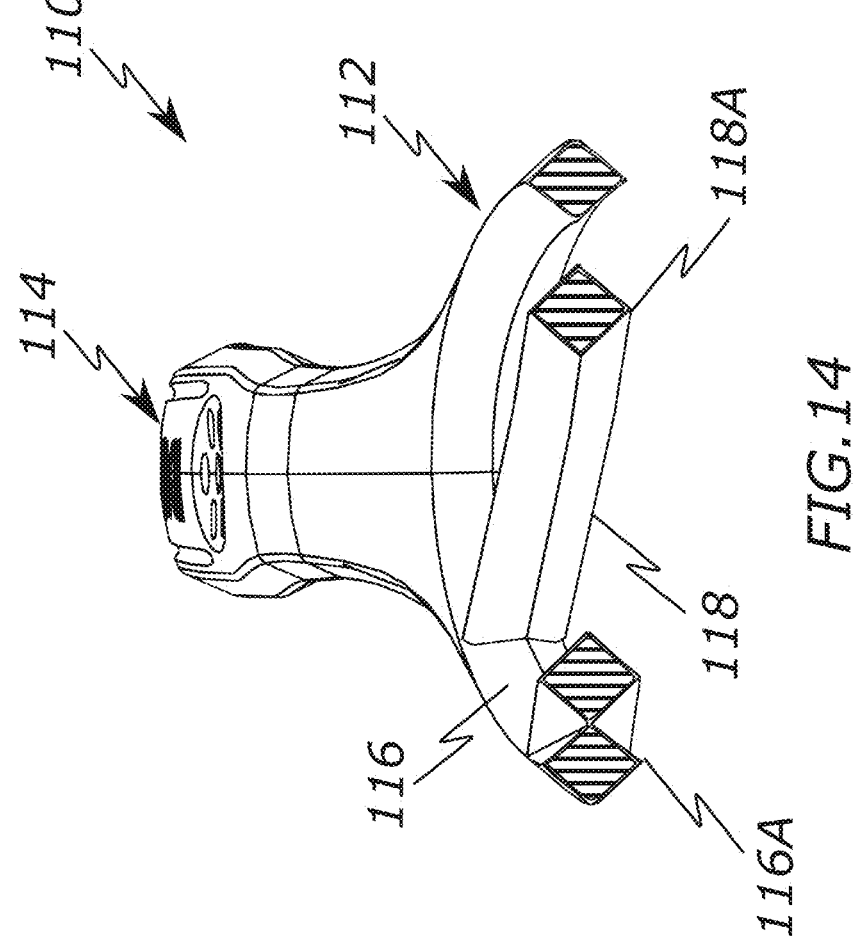
FIG. 14 illustrates a cross-sectional view taken along lines 14-14 in FIG. 9.

FIGS. 8-14 illustrate another example of a mixing tool 110 with a plurality of elongated fins 118 positioned at a different angle than those of the mixing tool 100. FIG. 8 illustrates a perspective view of the mixing tool 110, FIG. 9 illustrates a front side of the mixing tool 110, FIG. 10 illustrates a back side of the mixing tool 110, FIG. 11 illustrates a lateral side of the mixing tool 110, FIG. 12 illustrates a distal end view of the mixing tool 110, FIG. 13 illustrates a proximal end view of the mixing tool 110, and FIG. 14 illustrates a cross-sectional view taken along lines 14-14 in FIG. 9. These figures will be discussed concurrently below.

Unless mentioned otherwise, the mixing tool 110 and its components may be similar to like-named components of the mixing tool 100. For example, the mixing tool 110 may include a tool portion 112 comprising an outer frame 116 attached to a plurality of elongated fins 118 and to a handle portion 114. Additionally, edges 116A and 118A may be included on the front side and back side of the outer frame 116 and plurality of elongated fins 118 respectively.

However, the plurality of elongated fins 118 of the mixing tool 110 may be rotationally oriented or positioned at intermediate angles 110B (or the inverse of this angle) between a longitudinal axis 110A (FIG. 9) of the mixing tool 110 and a perpendicular axis relative to the longitudinal axis 110A when looking at a front side of the mixing tool 110. In some examples, the 110B is within an inclusive range of about 10 degrees and 80 degrees. In a specific example, the intermediate angles 110B is about 45 degrees. Different orientations of the elongated fins 118 may be helpful depending on the angle/orientation that the user may mix materials at within a container. Containers with taller or shorter sides may also influence which angles are optimal. Hence, some angles may may work better for certain users and uses.

Figure 15:
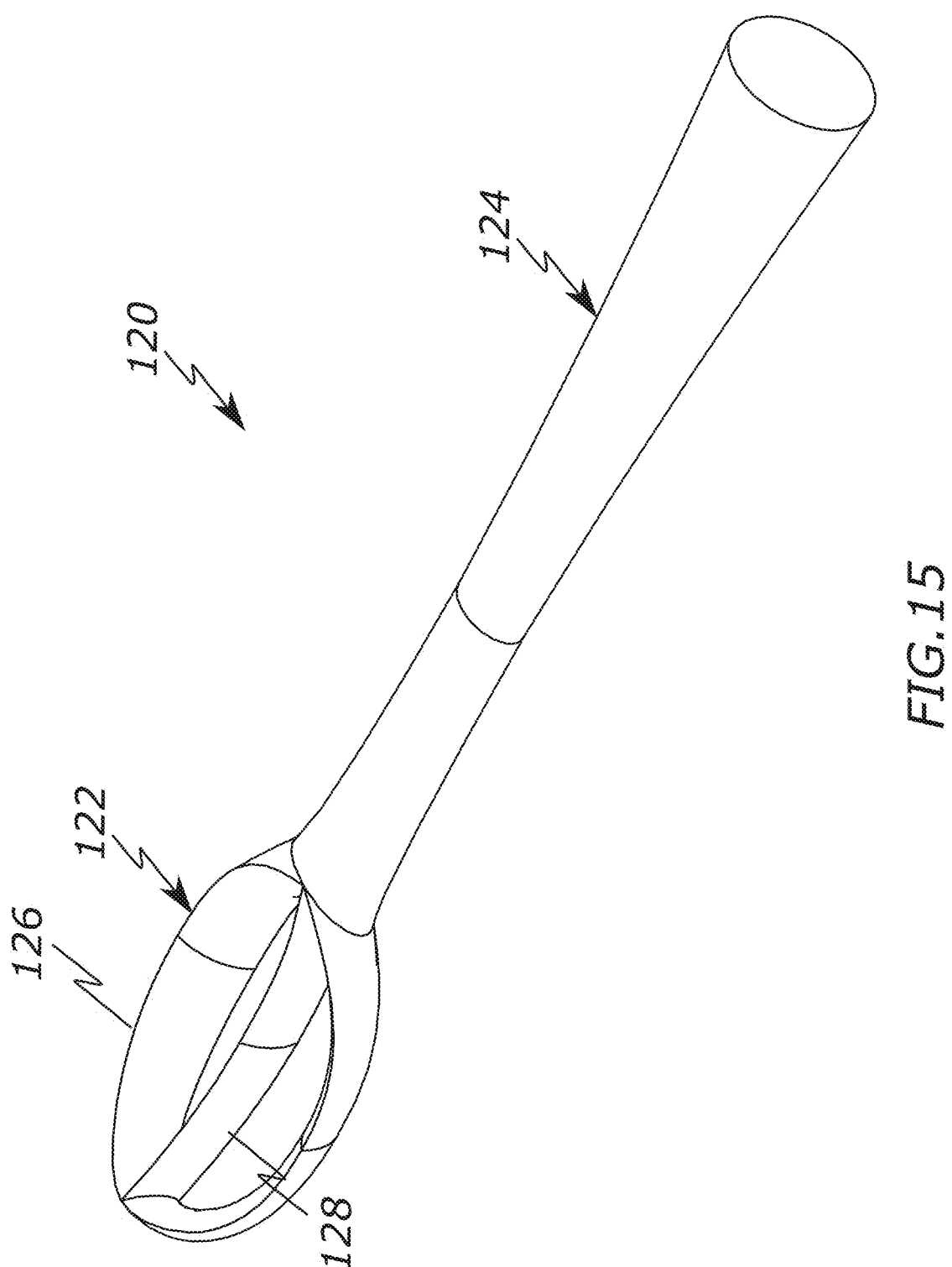
FIG. 15 illustrates a perspective view of an example mixing tool 120.
Figures 16, 17:
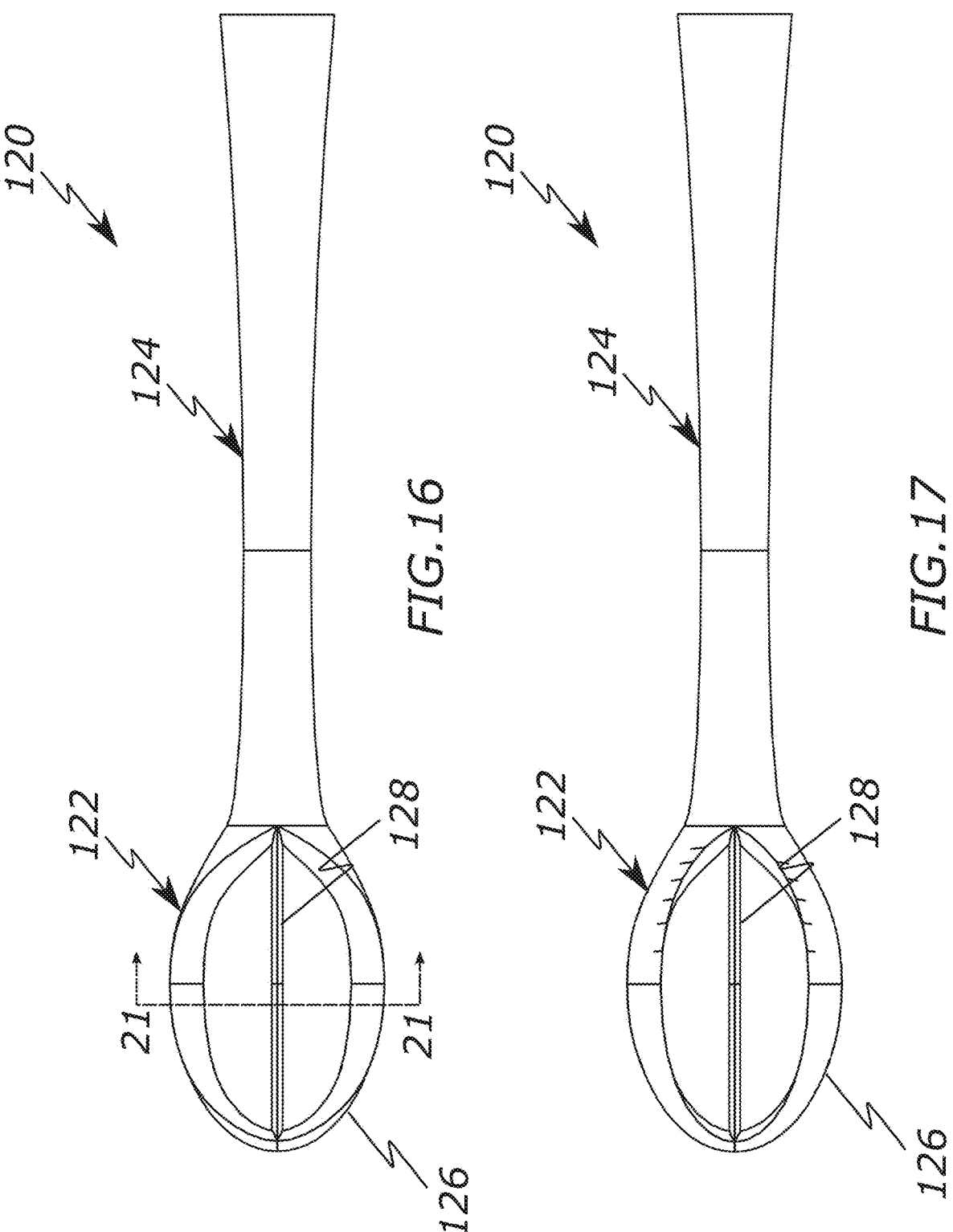
FIG. 16 illustrates a front side of the mixing tool 120 of FIG. 15.
FIG. 17 illustrates a back side of the mixing tool 120 of FIG. 15.

FIGS. 15-21 illustrate another example of a mixing tool 120 with a single elongated fin 128 as opposed to the multiple plurality of elongated fins 108 of the mixing tool 100 and the plurality of elongated fins 118 of the mixing tool 110. FIG. 15 illustrates a perspective view of the mixing tool 120, FIG. 16 illustrates a front side of the mixing tool 120, FIG. 17 illustrates a back side of the mixing tool 120, FIG.

Figures 18, 19, 20:
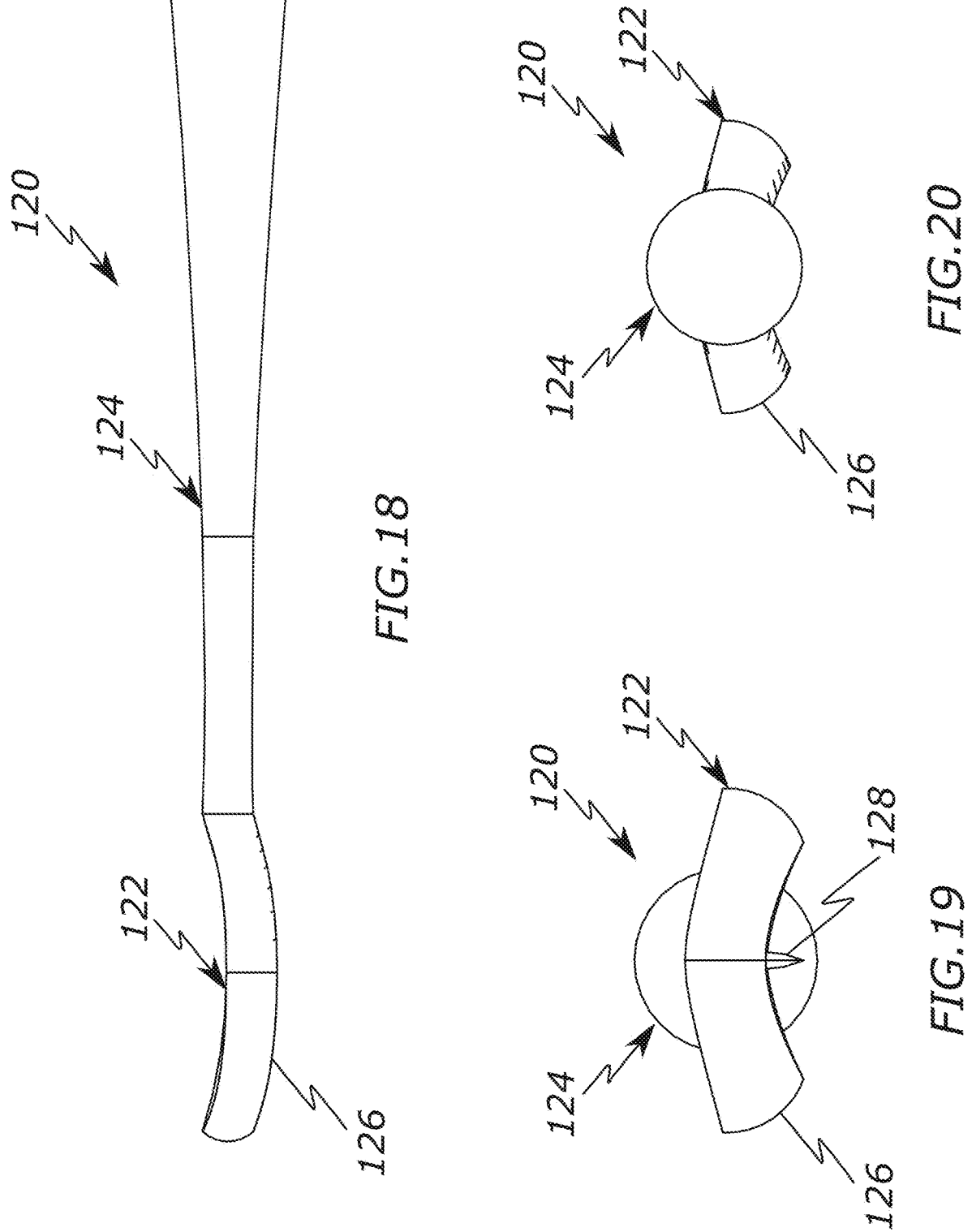
FIG. 18 illustrates a lateral side of the mixing tool 120 of FIG. 15.
FIG. 19 illustrates a distal end view of the mixing tool 110 of FIG. 15.
FIG. 20 illustrates a proximal end view of the mixing tool 120 of FIG. 15.
Figure 21:
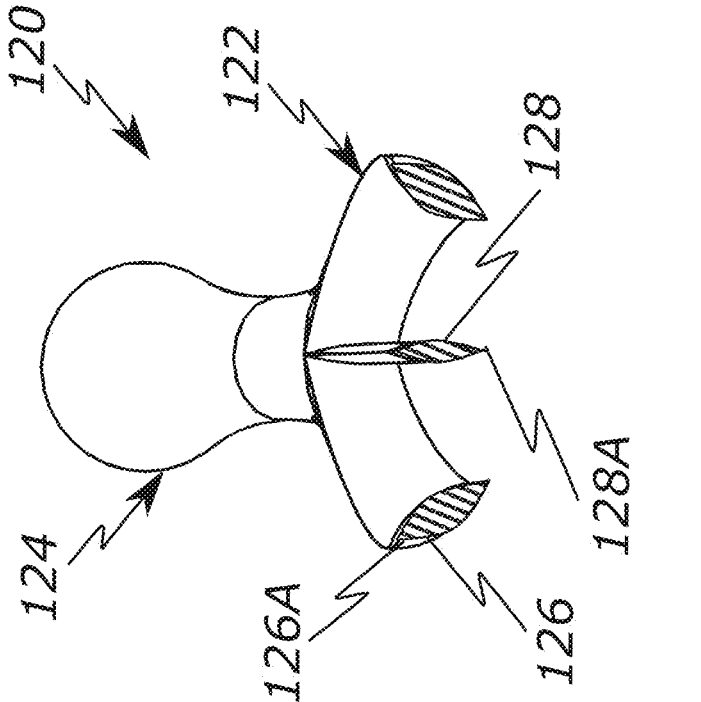
FIG. 21 illustrates a cross-sectional view taken along lines 21-21 in FIG. 16.

18 illustrates a lateral side of the mixing tool 120, FIG. 19 illustrates a distal end view of the mixing tool 110, FIG. 20 illustrates a proximal end view of the mixing tool 120, and FIG. 21 illustrates a cross-sectional view taken along lines 21-21 in FIG. 16. These figures will be discussed concurrently below.

Unless mentioned otherwise, the mixing tool 120 and its components may be similar to like-named components of the mixing tool 100. For example, the mixing tool 120 may include a tool portion 122 comprising an outer frame 126 attached to an elongated fin 128 and to a handle portion 124. Additionally, edges 126A and 128A may be included on the front side and back side of the outer frame 126 and single elongated fin 128 respectively.

However, instead of a plurality of elongated fins 108, only a single elongated fin 128 is included. In the present example, the single elongated fin 128 is connected to proximal and distal areas of the outer frame 126. Alternatively, the single elongated fin 128 may be connected laterally across the outer frame 126.

Additionally, as seen best in FIG. 21, the outer frame 126 is shaped such that edges 126A are oriented at non-parallel angles relative to the edges 128A of the single elongated fin 128.

Figures 22, 23:
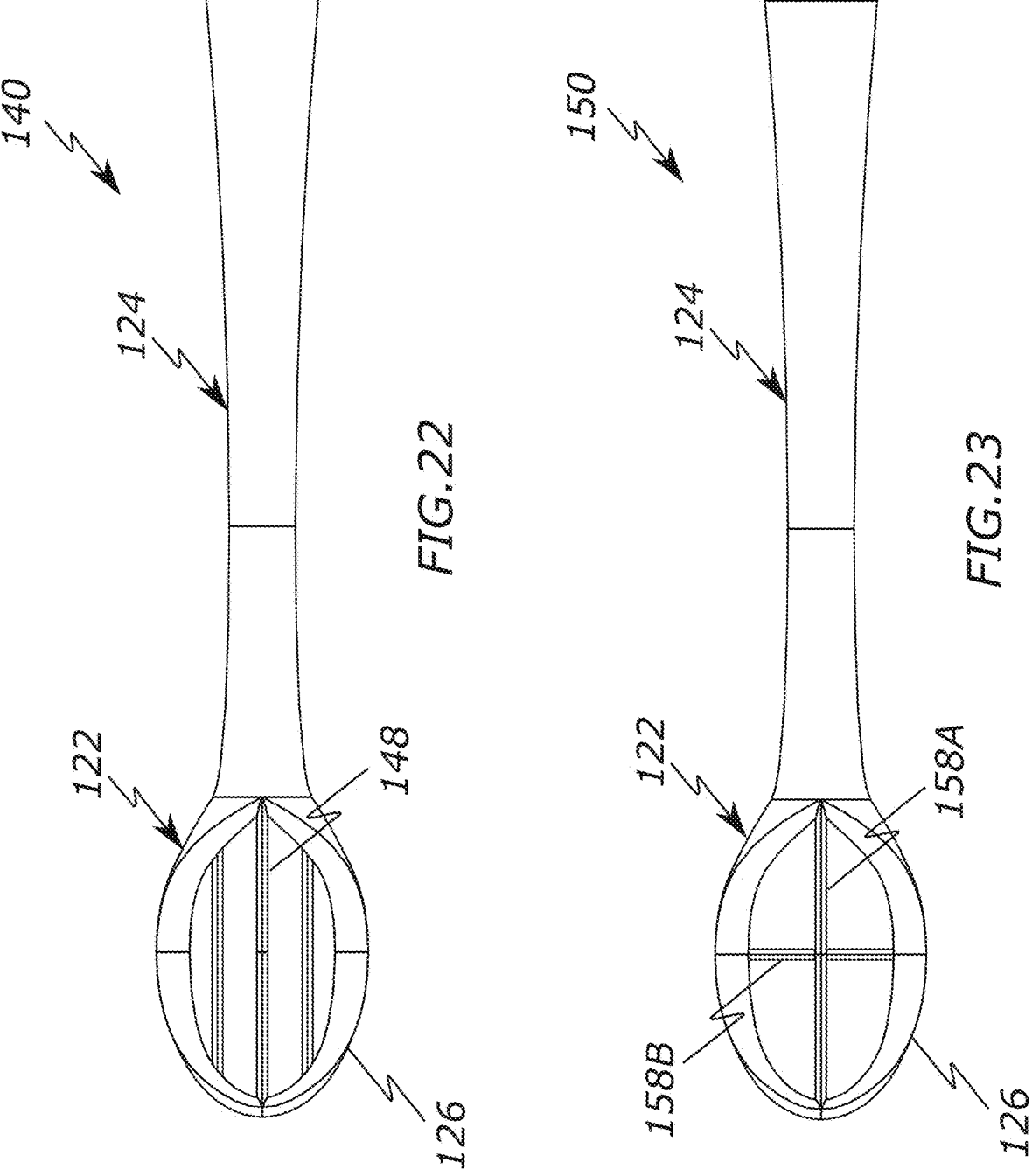
FIG. 22 illustrates a front view of an example mixing tool.
FIG. 23 illustrates a front view of an example mixing tool.
Figures 24, 25:
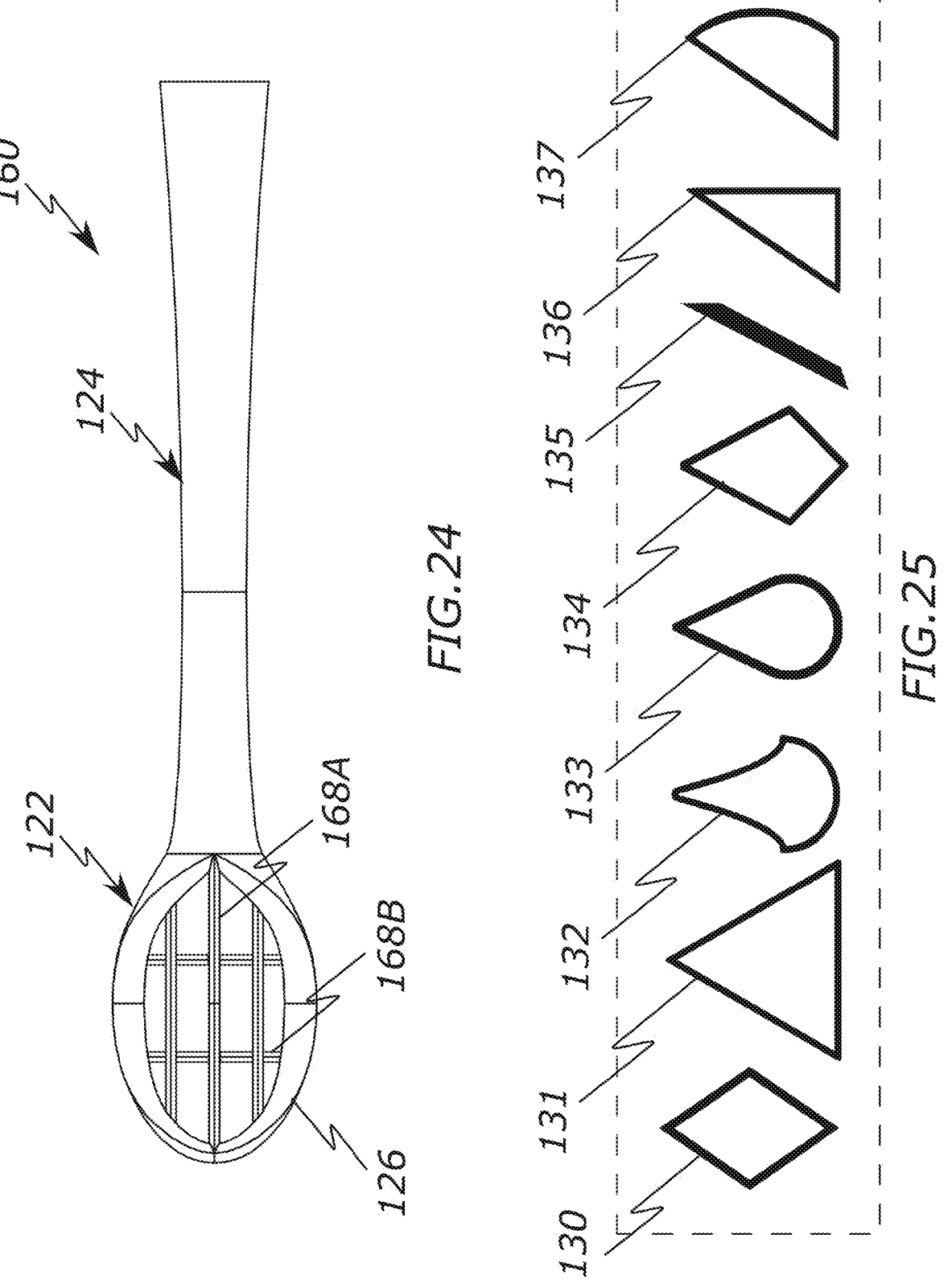
FIG. 24 illustrates a front view of an example mixing tool.
FIG. 25 illustrates example cross sections of elongated fins.

The elongated fins may be arranged in other configurations as well. For example, FIG. 22 illustrates a front view of a mixing tool 140 that is similar to mixing tool 120 except that it includes a plurality of elongated fins 148 connected between proximal and distal areas of the outer frame 126. In another example, FIG. 23 illustrates a front view of a mixing tool 150 that is similar to mixing tool 120 except it has a single longitudinally oriented elongated fin 158A and a single laterally oriented elongated fin 158B that crosses or intersects the single longitudinally oriented elongated fin 158A. In another example, FIG. 24 illustrates a front view of a mixing tool 160 that is similar to mixing tools 120, 124 except that it has a plurality of longitudinally oriented elongated fins 168A and a plurality of laterally oriented elongated fins 168B that cross or intersect the plurality of longitudinally oriented elongated fins 168A.

As previously discussed, the elongated fins may have many different cross-sectional shapes that include one or more edges. FIG. 25 illustrates several specific example cross sectional shapes. For example, elongated fin 130 has a generally diamond or rhombus cross-sectional shape, elongated fin 131 has a generally triangular cross-sectional shape, elongated fin 132 has a teardrop cross-sectional shape with inwardly curved sides, elongated fin 133 has a traditional teardrop cross-sectional shape, elongated fin 134 has a rhombus-like cross-sectional, shape with two sides that are longer than two opposite sides, elongated fin 135 has a thin angled cross-sectional shape, elongated fin 136 has a right triangle shape, and elongated fin 137 has a modified right triangle shape with a rounded/curved side.

The examples of the present specification illustrate mixing tools with handle portions intended for use by a user's hands. However, the handle portion of any of these examples may instead be replaced with an attachment mechanism for a mixing machine (e.g., a kitchen stand mixer, bread machine, hand mixer, or similar devices).

What is claimed is:

1. A mixing tool, comprising
a handle portion having an elongated shape; and
a tool portion connected at an end of the handle portion;
the tool portion including an outer frame having a loop shape and a plurality of elongated fins that are each connected to the outer frame; wherein each of the plurality of elongated fins include a first cutting edge extending along a length of a first side of each of the plurality of elongated fins; and wherein the first cutting edge includes two deflecting sides that meet each other to form a peak.

2. The mixing tool of claim 1, wherein at least one of the plurality of elongated fins is connected at a proximal area and at a distal area of the outer frame in a longitudinal orientation.

3. The mixing tool of claim 2, wherein the plurality of elongated fins are curved towards one of lateral sides of the outer frame.

4. The mixing tool of claim 2, wherein the plurality of elongated fins include a second cutting edge extending along a length of a second side of each of the plurality of elongated fins, wherein the second side is opposite the first side.

5. The mixing tool of claim 2, wherein the outer frame includes an edge positioned around a portion of the loop shape.

6. The mixing tool of claim 1, wherein the outer frame and the plurality of elongated fins form a concave shape.

7. The mixing tool of claim 1, wherein at least one of the plurality of elongated fins is connected to the outer frame in a lateral orientation.

8. The mixing tool of claim 1, wherein at least one of the plurality of elongated fins is connected to the outer frame in a lateral orientation and intersects with at least one of the plurality of elongated fins with a longitudinal orientation.

9. The mixing tool of claim 1, wherein at least one of the plurality of elongated fins is connected to the outer frame and oriented at an angle within an inclusive range of about 10 degrees and about 80 degrees relative to a longitudinal axis of the mixing tool.

10. The mixing tool of claim 1, wherein each of the plurality of elongated fins include a diamond, rhombus, triangular, or teardrop cross sectional shape.

11. The mixing tool of claim 1, wherein the two deflecting sides meet to form an angle within an inclusive range of about 20 degrees to about 160 degrees.

12. The mixing tool of claim 11, wherein the angle is about 45 degrees.

13. A mixing tool, comprising
a handle portion having an elongated shape; and
a tool portion connected at an end of the handle portion;
the tool portion including an outer frame having a loop shape and a plurality of elongated fins attached to the outer frame; wherein each of the plurality of elongated fins include a first cutting edge extending along a length of a first side of each of the plurality of elongated fins; and wherein the first cutting edge is formed by two deflecting sides that meet each other.

14. The mixing tool of claim 13, wherein at least one of the plurality of elongated fins is attached to a proximal area and to a distal area of the outer frame in a longitudinal orientation.

15. The mixing tool of claim 14, wherein the plurality of elongated fins are curved towards one of lateral sides of the outer frame.

16. The mixing tool of claim 14, wherein the plurality of elongated fins include a second cutting edge extending along a length of a second side of each of the plurality of elongated fins, wherein the second side is opposite the first side.

17. The mixing tool of claim 14, wherein the outer frame includes an edge positioned around a portion of the loop shape.

18. The mixing tool of claim 13, wherein the outer frame and the plurality of elongated fins form a concave shape.

19. The mixing tool of claim 13, wherein at least one of the plurality of elongated fins is attached to the outer frame in a lateral orientation.

20. The mixing tool of claim 13, wherein at least one of the plurality of elongated fins are each attached to the outer frame in a lateral orientation and intersect with at least one of the plurality of elongated fins with a longitudinal orientation.

* * * * *